June 4, 1929.  A. C. URCH  1,715,876

AUXILIARY CIRCULATING DEVICE

Filed Jan. 26, 1928

INVENTOR.
Andrew C. Urch
BY
Harry Bowen
ATTORNEY.

Patented June 4, 1929.

1,715,876

UNITED STATES PATENT OFFICE.

ANDREW C. URCH, OF SEATTLE, WASHINGTON.

AUXILIARY CIRCULATING DEVICE.

Application filed January 26, 1928. Serial No. 249,616.

The invention is an auxiliary circulating device that is adaptable to be readily inserted in pipes forming a complete circuit, as in a hot water heating system to stimulate the circulation therein.

The object of the invention is to provide a simple and efficient auxiliary circulating device that may readily be inserted in a hot water heating system or pipe circuit to mechanically circulate the water.

Another object of the invention is to provide a circulating device that may be inserted in a pipe circuit which will not decrease the area of the pipe in which it is inserted.

A further object of the invention is to provide a circulating device for pipe circuits which is arranged so that the packing gland may be removed and repacked without permitting the water to leak through the fitting in which it is installed.

And a still further object of the invention is to provide an auxiliary circulating device for pipe circuits which is of a simple and economical construction.

With these ends in view the invention embodies a small propeller mounted in the end of a sleeve with a packing gland at the outer end of the sleeve, a bushing for holding the sleeve in a fitting having a short piece of pipe extending from the opposite end and being adaptable to hold the sleeve in such a position that the propeller will be positioned in the short piece of pipe and also reducing connections on the fitting and pipe to permit the device to be installed in a pipe of a smaller size than the fitting. The device is also provided with a small motor to operate the propeller.

Other features and advantages of the invention will appear from the following description taken in connection with the drawings, wherein:—

Figure 1:
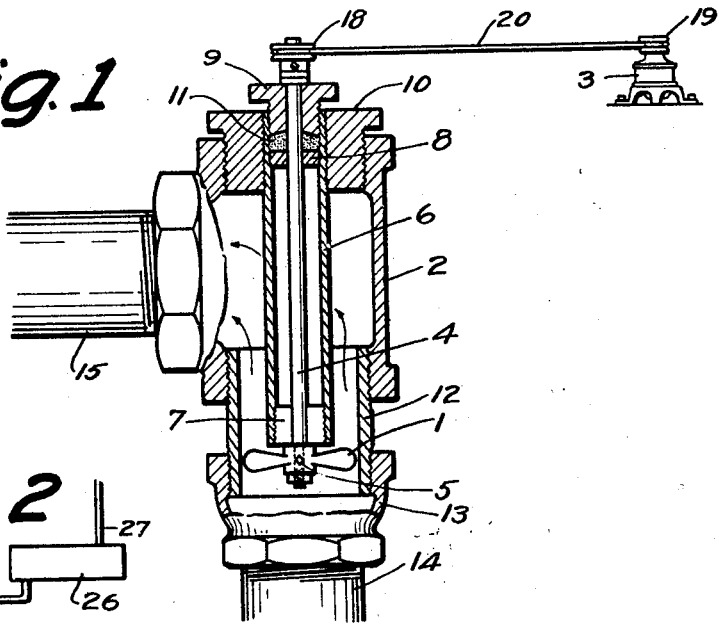
Figure 1 is a vertical section through the center of the fitting showing the device as it would appear in use.

In the drawings the device is shown as it would be made wherein numeral 1 indicates the propeller, numeral 2 the fitting in which the propeller is installed, and numeral 3 a motor by which the propeller may be driven.

The propeller 1 may be made with two blades on a hub as shown in Figure 1 and mounted upon a shaft 4 upon which it may be held by a set screw 5 and the shaft is mounted in a sleeve 6 having a bushing 7 forming a bearing in the lower end, and a small bushing 8 which with the packing gland 9 forms a bearing at the upper end. The outer upper end of the sleeve 6 is threaded and screwed into a large bushing 10 which is screwed into the upper end of the fitting 2. It will therefore be observed that the packing as indicated by the numeral 11 may be removed and re-placed or the packing gland 9 adjusted without permitting leakage through the device.

At the lower end of the fitting 2 is a nipple 12 having a reducing fitting 13 at the lower end into which the end of a piece of pipe 14 is screwed as shown. The pipe 14 may be any pipe in the system, however in the design shown the pipe 14 forms a return pipe of the system. The fitting 2 which is a reducing T is provided with a reducing branch into which a pipe 15 is screwed and it will be observed that the pipe 15 is the same as the pipe 14 or forms the short connection from the fitting to the boiler or from the end of the pipe 14 to the boiler. The pipes 14 and 15 may be provided with valves 16 and 17 so that the entire fitting 2 may be removed and re-placed if desired. These valves may be omitted if desired.

At the upper end of the shaft 4 is a pulley 18 which is driven by a pulley 19 through a belt 20 and the pulley 19 is mounted on the shaft of the motor 3. It is understood, however that although this device is shown as being operated by a belt from a motor, any suitable connection may be made between the motor and propeller shaft or the propeller shaft may be driven by any suitable means.

Figure 2:
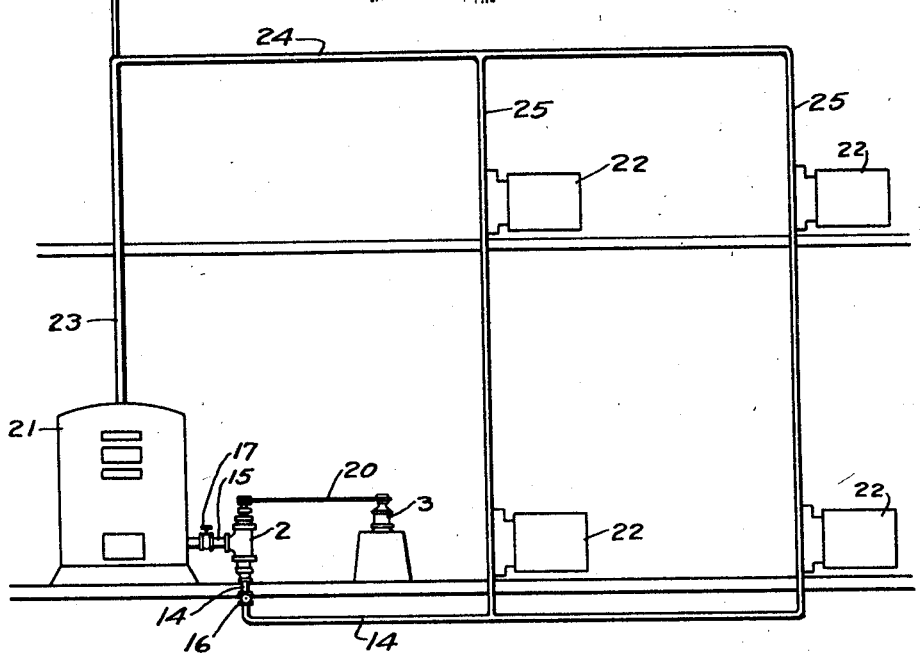
Figure 2 is a diagrammatic view showing a hot water heating system with the device installed in the return pipe.

It will be noted in Figure 2 that the furnace or boiler as indicated by the numeral 21 may be located at any convenient position and is connected to radiators as indicated by the numeral 22 through a riser 23, an overhead pipe 24 and down pipes 25. The system is also provided with an expansion tank 26 having a vent 27 extending to the roof at some convenient point.

It will be understood that changes may be made in the construction without departing from the spirit of the invention. One of which changes may be in the use of the device in a fitting of a different type, another may be in the use of other means for mounting the propeller, and still another may be in the use of the device in a system of a different type.

The construction will be readily understood from the foregoing description. The fitting may be provided as shown in Figure 1 with the propeller installed and by breaking the joint between the pipes 14 and 15 at the elbow the fitting may be readily installed at this point as shown. The motor may then be located at any convenient point and it will be observed that the device may be used when desired. It will also be observed that as the propeller and sleeve 6 are inserted in an enlarged piece of pipe the area of the pipes 14 and 15 will not be decreased as the pipe 12 may be of sufficient size to provide an area around the propeller and sleeve which is equal to the area of the pipes 14 and 15. The device may therefore remain in the system and in normal temperatures may not be used. However when it is desired to obtain a rapid circulation the device may be started and it will be observed that it will considerably increase the circulation through the system.

The fitting 2 may also be formed by a special casting in which the propeller may be installed which will eliminate the nipple and bushings if desired.

Having thus fully described the invention what I claim as new and desire to secure by Letters Patent, is:—

In a circulating device for hot water heating systems, a T adaptable to be inserted in the return pipe of the system, a tubular casing adaptable to be inserted into the T, a nut at the upper end of the tubular casing adaptable to be screwed into the T and hold the said tubular casing therein, a packing gland in the outer end of the said tubular casing, a shaft journaled in the said packing gland and extending through the said tubular casing, another journal for the said shaft at the opposite, or inner, end of the said tubular casing, a propeller mounted upon the said shaft at the inner end of the said tubular casing and beyond the end thereof, a pulley on the opposite end of the said shaft and extending beyond the end of the said casing and packing gland, means whereby the said shaft may be rotated through the said pulley, a nipple extending from the end of the said T in which the said propeller is positioned, and a suitable reducing fitting at the end of the said nipple.

ANDREW C. URCH.